(12) United States Patent
Aoki

(10) Patent No.: US 9,701,358 B2
(45) Date of Patent: Jul. 11, 2017

(54) INVERTED MOVING BODY

(71) Applicant: TOYOTA JIDOSHA KABUSHIKI KAISHA, Toyota-shi (JP)

(72) Inventor: Eisuke Aoki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/919,117

(22) Filed: Oct. 21, 2015

(65) Prior Publication Data

US 2016/0176465 A1 Jun. 23, 2016

(30) Foreign Application Priority Data

Dec. 18, 2014 (JP) .................................. 2014-256736

(51) Int. Cl.
*B62D 11/02* (2006.01)
*B62K 3/00* (2006.01)
*B62K 11/00* (2006.01)

(52) U.S. Cl.
CPC .............. *B62K 3/007* (2013.01); *B62K 11/00* (2013.01); *B62K 11/007* (2016.11)

(58) Field of Classification Search
None
See application file for complete search history.

(56) References Cited

U.S. PATENT DOCUMENTS

| | | | |
|---|---|---|---|
| 2010/0023248 A1 | 1/2010 | Nishikawa | |
| 2010/0114468 A1* | 5/2010 | Field | B60N 2/045 701/124 |
| 2011/0209929 A1* | 9/2011 | Heinzmann | G05D 1/0891 180/6.2 |
| 2012/0173043 A1* | 7/2012 | Kobashi | B62J 25/00 701/1 |
| 2014/0008138 A1 | 1/2014 | Kim et al. | |
| 2015/0175190 A1* | 6/2015 | Ito | B62D 1/02 180/6.5 |

FOREIGN PATENT DOCUMENTS

| | | |
|---|---|---|
| EP | 2 128 012 A1 | 12/2009 |
| JP | 2007-186184 | 7/2007 |
| JP | 2008-87674 A | 4/2008 |
| JP | 2010-23705 | 2/2010 |
| JP | 2010-247723 A | 11/2010 |

(Continued)

*Primary Examiner* — Truc M Do
*Assistant Examiner* — Jess Whittington
(74) *Attorney, Agent, or Firm* — Oblon, McClelland, Maier & Neustadt, L.L.P.

(57) ABSTRACT

An inverted moving body includes: a riding part; a posture detection unit that detects a rotation angle of the riding part in a front-back direction; and a controller that switches, when a switching condition is satisfied, a non-inverted control state to an inverted control state. The inverted moving body includes a supporting part capable of supporting the inverted moving body in the inverted state while being in contact with the ground in the non-inverted control state. The switching condition includes a condition that an angle variation amount from the rotation angle of the riding part in the front-back direction in a state in which the supporting part is in contact with the ground is equal to or larger than a threshold.

4 Claims, 11 Drawing Sheets

(56) References Cited

FOREIGN PATENT DOCUMENTS

| | | | | |
|---|---|---|---|---|
| JP | 2011-201386 | | 10/2011 | |
| JP | 2012-101637 | | 5/2012 | |
| JP | 2012101637 | * | 5/2012 | .............. B62J 25/00 |
| JP | 4948416 | | 6/2012 | |
| WO | WO 2006/042301 A2 | | 4/2006 | |

* cited by examiner

INVERTED MOVING BODY

INCORPORATION BY REFERENCE

This application is based upon and claims the benefit of priority from Japanese patent application No. 2014-256736, filed on Dec. 18, 2014, the disclosure of which is incorporated herein in its entirety by reference.

BACKGROUND OF THE INVENTION

1. Field of the Invention

The present invention relates to an inverted moving body, and more specifically, to an inverted moving body that is switched from a non-inverted control state to an inverted control state based on a rotation angle of the inverted moving body in the front-back direction.

2. Description of Related Art

A typical inverted moving body is switched from a non-inverted control state to an inverted control state when a user rides the inverted moving body. For example, Japanese Unexamined Patent Application Publication No. 2012-101637 discloses an inverted moving body that detects a posture angle of a vehicle axis of the inverted moving body with respect to a reference axis using a posture detection unit and is switched from the non-inverted control state to the inverted control state when the posture angle that is detected is equal to or smaller than a threshold.

The inverted control state is a state in which a driving wheel is controlled to keep the inverted state when the inverted moving body is rotated in the front-back direction and the non-inverted control state is a state in which the driving wheel is not controlled to keep the inverted state.

While the inverted moving body disclosed in Japanese Unexamined Patent Application Publication No. 2012-101637 detects the posture angle of the vehicle axis of the inverted moving body with respect to the reference axis using the posture detection unit, the posture angle may not be accurately detected due to a temperature drift according to a change in the temperature or a decrease in an attachment accuracy of the posture detection unit to the inverted moving body due to an oscillation or the like. Therefore, the non-inverted control state may not be accurately switched to the inverted control state.

SUMMARY OF THE INVENTION

The present invention has been made in order to solve these problems and provides an inverted moving body that is accurately switched from the non-inverted control state to the inverted control state.

An inverted moving body according to an aspect of the present invention includes: a riding part which a user rides; a driving wheel; a posture detection unit that detects a rotation angle of the riding part in a front-back direction; and a controller that determines whether a switching condition to switch a non-inverted control state to an inverted control state is satisfied based on the rotation angle of the riding part in the front-back direction, and when the switching condition is satisfied, the controller switches the non-inverted control state to the inverted control state, in which: the inverted moving body includes a supporting part, the supporting part being located forwardly or backwardly of the driving wheel and being able to support the inverted moving body in the inverted state while being in contact with the ground in the non-inverted control state, and the switching condition includes a condition that an angle variation amount from the rotation angle of the riding part in the front-back direction in a state in which the supporting part is in contact with the ground is equal to or larger than a threshold.

The angle variation amount is hardly affected by an error even when a temperature drift according to a change in the temperature occurs in the posture detection unit or an attachment accuracy of the posture detection unit to the inverted moving body is decreased due to an oscillation or the like of the inverted moving body. Accordingly, by employing the configuration in which the non-inverted control state is switched to the inverted control state based on the angle variation amount from the rotation angle of the riding part in the state in which the supporting part is in contact with the ground, the non-inverted control state can be accurately switched to the inverted control state.

In the above inverted moving body, the switching condition preferably includes a condition that the state in which the angle variation amount from the rotation angle of the riding part in the front-back direction while the supporting part is in contact with the ground is equal to or larger than the threshold continues for a predetermined period of time.

According to this structure, it is possible to suppress the switching from the non-inverted control state to the inverted control state in a state in which the user's riding condition is not stable.

The above inverted moving body preferably includes a first load detection unit that detects a load input to the riding part from a right leg of a user; and a second load detection unit that detects a load input to the riding part from a left leg of the user, in which, when a detection signal is output from one of the first load detection unit and the second load detection unit, the controller preferably increases the period compared to a case in which detection signals are output from the first load detection unit and the second load detection unit.

According to this structure, when a state in which the user rides the riding part is a one-leg state, the switching from the non-inverted control state to the inverted control state can be suppressed. Further, when a state in which the user rides the riding part is a two-leg state, the non-inverted control state can be promptly switched to the inverted control state.

The above inverted moving body preferably includes a manipulation unit that changes the period, in which the controller preferably changes the period based on a manipulation signal of the manipulation unit.

Accordingly, it is possible to easily switch the determination of whether to execute the determination of whether the state in which the angle variation amount of the riding part is equal to or larger than the threshold continues for a predetermined period.

As described above, it is possible to provide an inverted moving body that is accurately switched from the non-inverted control state to the inverted control state.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Description is hereinafter made of preferable embodiments to achieve the present invention with reference to the accompanying drawings. It should be noted that the present invention is not limited to the following embodiments. The following description and the drawings are simplified as needed to clarify the description.

First Embodiment

Figure 1:
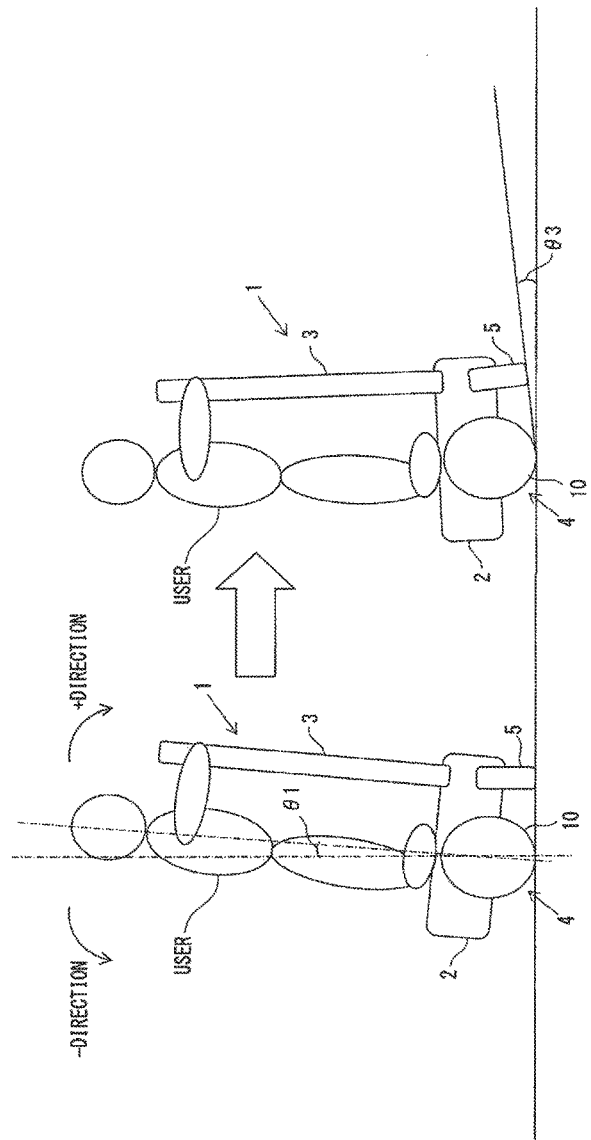
FIG. 1(a) is a diagram schematically showing a non-inverted control state of an inverted moving body according to a first embodiment.
FIG. 1(b) is a diagram schematically showing an inverted control state of the inverted moving body according to the first embodiment.
Figure 2:
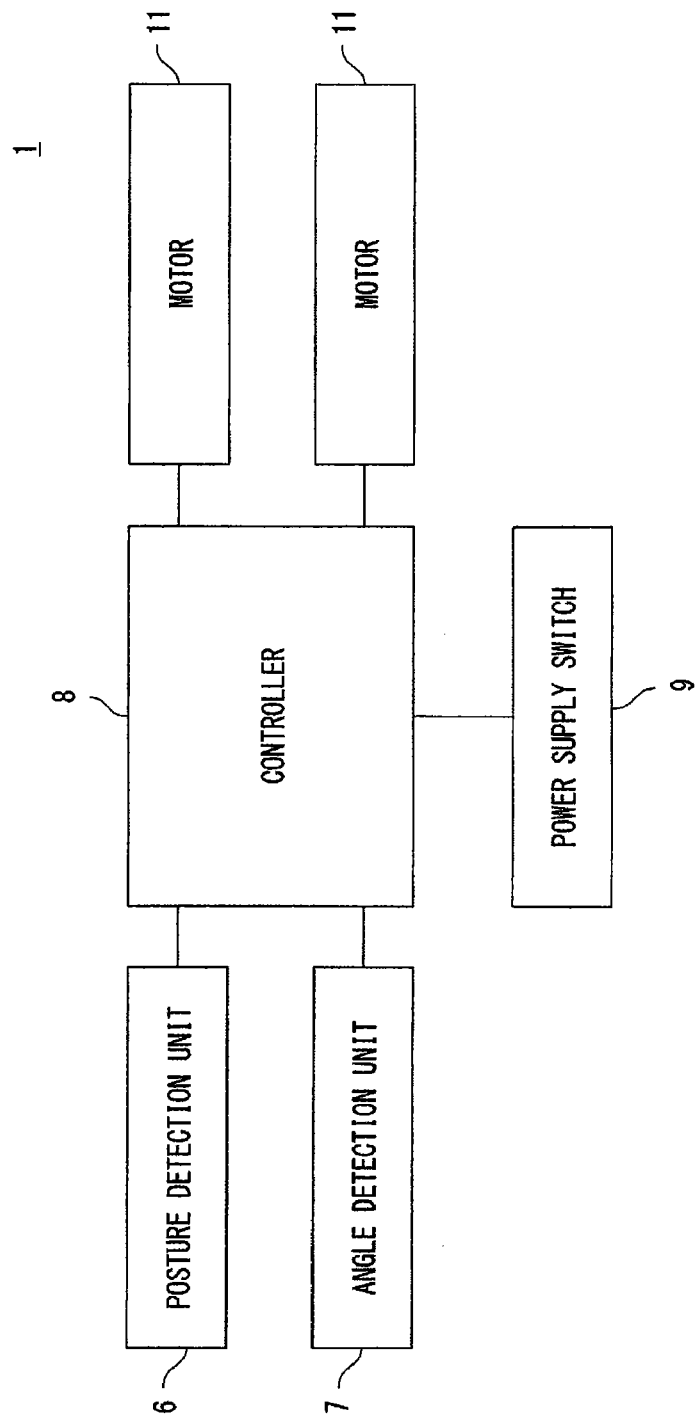
FIG. 2 is a block diagram showing a control system of the inverted moving body according to the first embodiment.

First, a configuration of an inverted moving body according to this embodiment will be described. FIG. 1(a) is a diagram schematically showing a non-inverted control state of the inverted moving body according to this embodiment. FIG. 1(b) is a diagram schematically showing an inverted control state of the inverted moving body according to this embodiment. FIG. 2 is a block diagram showing a control system of the inverted moving body according to this embodiment.

As shown in FIGS. 1(a), 1(b), and 2, an inverted moving body 1 includes a riding part 2, a handle 3, right and left driving wheels 4, a supporting part 5, a posture detection unit 6, an angle detection unit 7, a controller 8, and a power supply switch 9. The riding part 2 is a base part which a user rides. For example, the user puts both feet on the riding part 2 to ride the riding part 2 in an inverted posture.

The handle 3 is provided in the front part of the riding part 2 in such a way that it can be rotated in the lateral direction with respect to the forward and rearward directions of the inverted moving body 1.

The right and left driving wheels 4 each include a wheel 10, a decelerator (not shown), and a motor 11, and the motor 11 operates based on a control signal output from the controller 8 so that the angular velocity of the motor 11 becomes a desired angular velocity. The right and left driving wheels 4 are supported by the riding part 2.

The supporting part 5 is located forwardly or rearwardly of the driving wheels 4 and is able to support the inverted moving body 1 in the inverted state while being in contact with the ground. The supporting part 5 according to this embodiment protrudes downwardly from the riding part 2 in the front of the driving wheels 4 and contacts a parallel surface when the inverted moving body 1 is rotated slightly forward. While a detailed description of the supporting part 5 will be omitted, the supporting part 5 preferably has a configuration in which, when the controller 8 is switched from the non-inverted control state to the inverted control state, the part that contacts the ground is removed from contact with the ground by an actuator or the part that contacts the ground is mechanically removed from contact with the ground by a wire, a pulley or the like.

The posture detection unit 6 detects a rotation angle θ1 of the inverted moving body 1 and furthermore the riding part 2 in the front-back direction. For example, the rotation angle θ1 of the riding part 2 is an inclination angle of a reference axis extending vertically with respect to the upper surface of the riding part 2, and is 0° when the upper surface of the riding part 2 is in the parallel state. When the rotation angle θ1 of the riding part 2 is expressed, the forward rotation of the inverted moving body 1 is expressed by + direction and the rearward rotation of the inverted moving body 1 is expressed by − direction.

The posture detection unit 6 outputs a detection signal of the rotation angle θ1 of the riding part 2 to the controller 8. The posture detection unit 6 may be a typical posture detection apparatus and may be, for example, a gyro sensor or an acceleration sensor.

The angle detection unit 7 detects a rotation angle θ2 of the inverted moving body 1 in the lateral direction in the handle 3. The angle detection unit 7 outputs a detection signal indicating the rotation angle θ2 of the handle 3 to the controller 8. The angle detection unit 7 may be a typical angle detection apparatus and may be, for example, an encoder.

The controller 8 controls the motors 11 of the right and left driving wheels 4 to keep the inverted state of the inverted moving body 1 based on the detection signal output from the posture detection unit 6. Further, the controller 8 controls the motors 11 of the right and left driving wheels 4 to allow the inverted moving body 1 to pivot in the lateral direction based on the detection signal output from the angle detection unit 7. Further, while the details of the controller 8 will be described later, the controller 8 determines whether a switching condition to switch the non-inverted control state to the inverted control state has been satisfied based on the rotation angle θ1 of the riding part 2 output from the posture detection unit 6, and when this switching condition is satisfied, the non-inverted control state is switched to the inverted control state.

The power supply switch 9 is a switch manipulated by the user to operate the controller 8.

Figure 3:
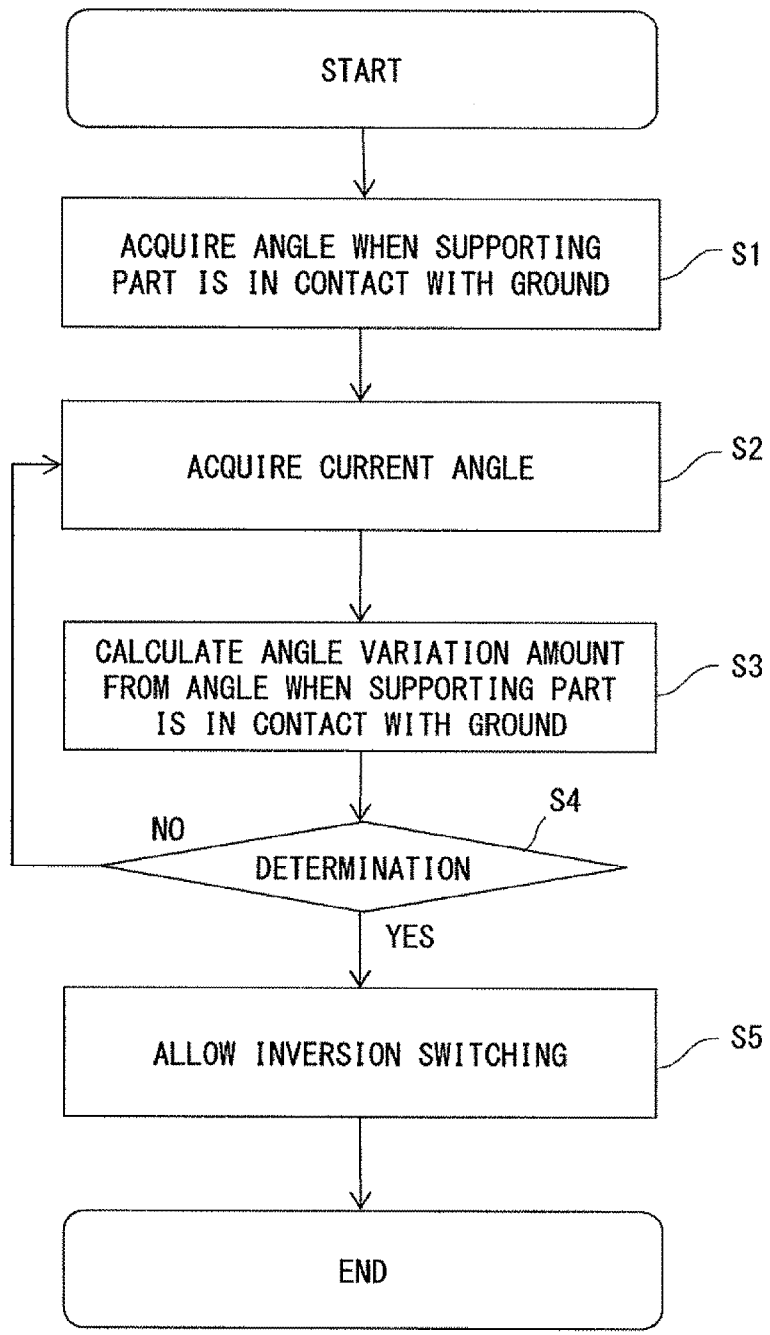
FIG. 3 is a flowchart showing a switching operation according to the first embodiment.

Next, the switching operation of the inverted moving body 1 from the non-inverted control state to the inverted control state (hereinafter it may be simply referred to as a switching operation) according to this embodiment will be described. FIG. 3 is a flowchart showing the switching operation according to this embodiment.

First, as shown in FIG. 1(a), the user rides the riding part 2 and turns on the power supply switch 9 in the state in which the supporting part 5 is in contact with the ground. This operation allows the controller 8 to acquire from the posture detection unit 6 the rotation angle θ1 of the riding part 2 in the state in which the supporting part 5 is in contact with the ground (S1). At this time, the controller 8 is still in the non-inverted control state.

The controller 8 then acquires the rotation angle θ1 of the riding part 2 in the state in which the user rides the riding part 2 (S2). At this time, the user rotates the inverted moving body 1 forwardly or backwardly so that the inverted moving body 1 is switched from the non-inverted control state to the inverted control state. In this embodiment, as shown in FIG. 1(b), the user rotates the inverted moving body 1 backwardly so that the rotation angle θ1 of the riding part 2 becomes 0°.

Next, the controller 8 calculates an angle variation amount θ3 of the riding part 2 from the rotation angle θ1 in the state in which the supporting part 5 is in contact with the ground (S3). That is, the controller 8 calculates the current rotation angle of the riding part 2 with reference to the state in which the supporting part 5 is in contact with the ground (that is, 0°).

Next, the controller 8 determines whether the switching condition to switch the non-inverted control state to the inverted control state is satisfied (S4). The controller 8 according to this embodiment determines whether the calculated angle variation amount θ3 is smaller than or equal to or larger than a first threshold. When the calculated angle variation amount θ3 is smaller than the first threshold, the controller 8 goes back to the process of S2 (NO in S4). On the other hand, when the calculated angle variation amount θ3 is equal to or larger than the first threshold (YES in S4), the controller 8 is switched from the non-inverted control state to the inverted control state (S5). While the first threshold is appropriately set based on the detection accuracy in the posture detection unit 6, it may be set to an angle variation amount larger than the angle variation amount at which the supporting part 5 is removed from contact with the ground.

As stated above, in this embodiment, the non-inverted control state is switched to the inverted control state based on the angle variation amount θ3 from the rotation angle θ1 of the riding part 2 in the state in which the supporting part 5 is in contact with the ground. The angle variation amount θ3 is hardly affected by an error even when a temperature drift according to a change in the temperature occurs in the posture detection unit 6 or an attachment accuracy of the posture detection unit 6 to the inverted moving body 1 is decreased due to an oscillation or the like of the inverted moving body 1. Accordingly, the inverted moving body 1 according to this embodiment is accurately switched from the non-inverted control state to the inverted control state.

While the controller 8 acquires the rotation angle θ1 of the riding part 2 by turning on the power supply switch 9 in this embodiment, the controller 8 may acquire the rotation angle θ1 of the riding part 2 when a detection signal is input to the controller 8 from a detection apparatus provided in the riding part 2 (e.g., load sensor) that detects the riding of the user.

Second Embodiment

Figure 4:
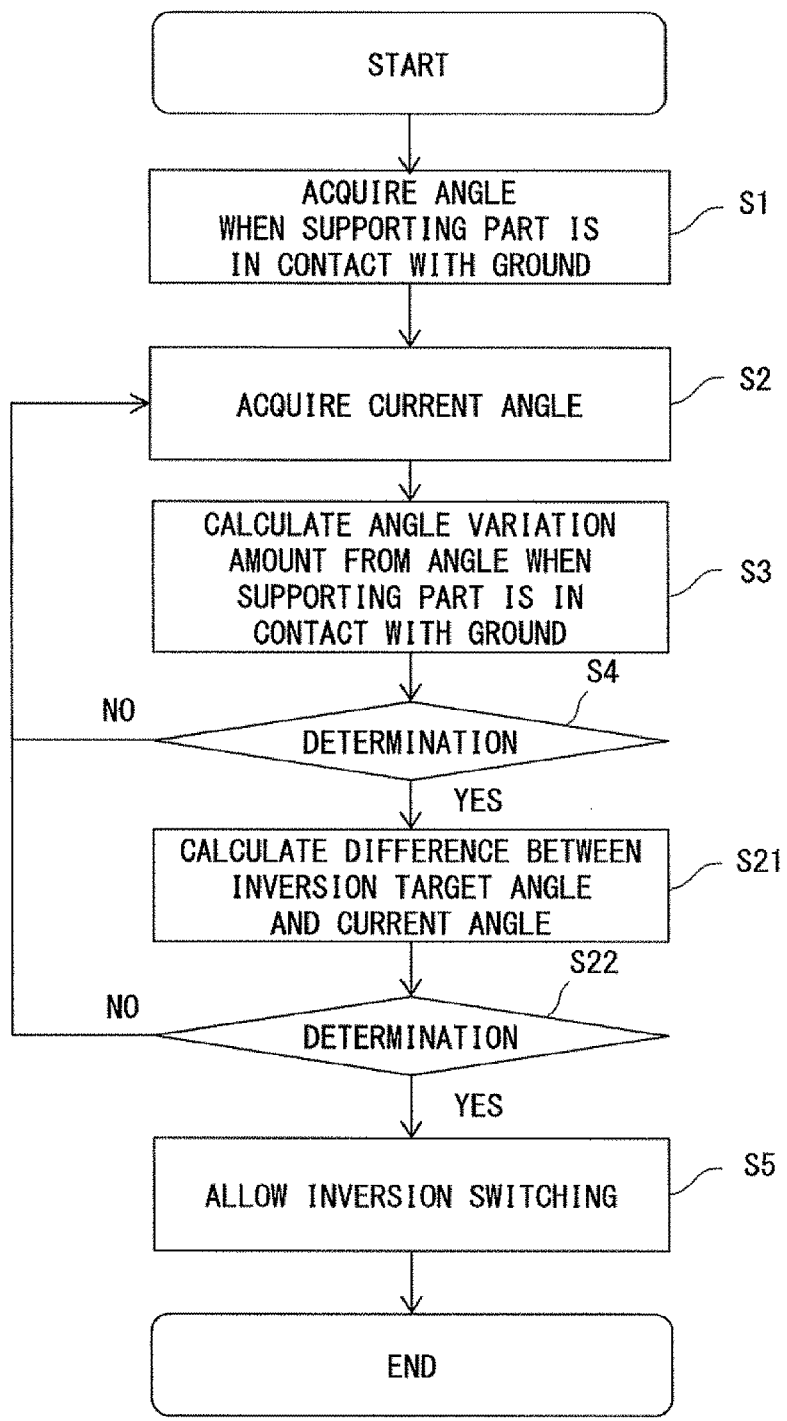
FIG. 4 is a flowchart showing a switching operation according to a second embodiment.

FIG. 4 is a flowchart showing a switching operation according to this embodiment. The descriptions already given in regard to the first embodiment are omitted and elements the same as those in the first embodiment are denoted by reference symbols the same as those in the first embodiment.

This embodiment is substantially similar to the first embodiment. In this embodiment, the switching condition further includes a condition that a difference between the rotation angle θ1 of the riding part 2 and an inversion target angle is equal to or smaller than a second threshold. Specifically, in the switching operation according to this embodiment, the controller 8 calculates, after the process of S4, the difference between the rotation angle θ1 of the riding part 2 and the inversion target angle (e.g., 0°) (S21).

Next, the controller 8 determines whether the difference between the rotation angle θ1 of the riding part 2 and the inversion target angle exceeds the second threshold (S22) or is equal to or smaller than the second threshold (S22). The second threshold according to this embodiment is set in each of + side and − side with respect to the inversion target angle. For example, the second threshold is set to an angle larger than an angle at which the user who rides the riding part 2 in the inverted control state rotates the riding part 2 in the front-back direction on each of + side and − side with respect to the inversion target angle. Accordingly, the controller 8 determines whether the difference between the rotation angle θ1 of the riding part 2 and the inversion target angle is within a predetermined angle range.

When the difference between the rotation angle θ1 of the riding part 2 and the inversion target angle exceeds the second threshold (NO in S22), the controller 8 goes back to the process of S2. On the other hand, when the difference between the rotation angle θ1 of the riding part 2 and the inversion target angle is equal to or smaller than the second threshold (YES in S22), the controller 8 switches the non-inverted control state to the inverted control state (S5).

As described above, in this embodiment, the controller 8 is switched from the non-inverted control state to the inverted control state based on, in addition to the angle variation amount θ3 of the riding part 2, the difference between the rotation angle θ1 of the riding part 2 and the inversion target angle, whereby it is possible to suppress erroneous switching from the non-inverted control state to the inverted control state.

Third Embodiment

Figure 5:
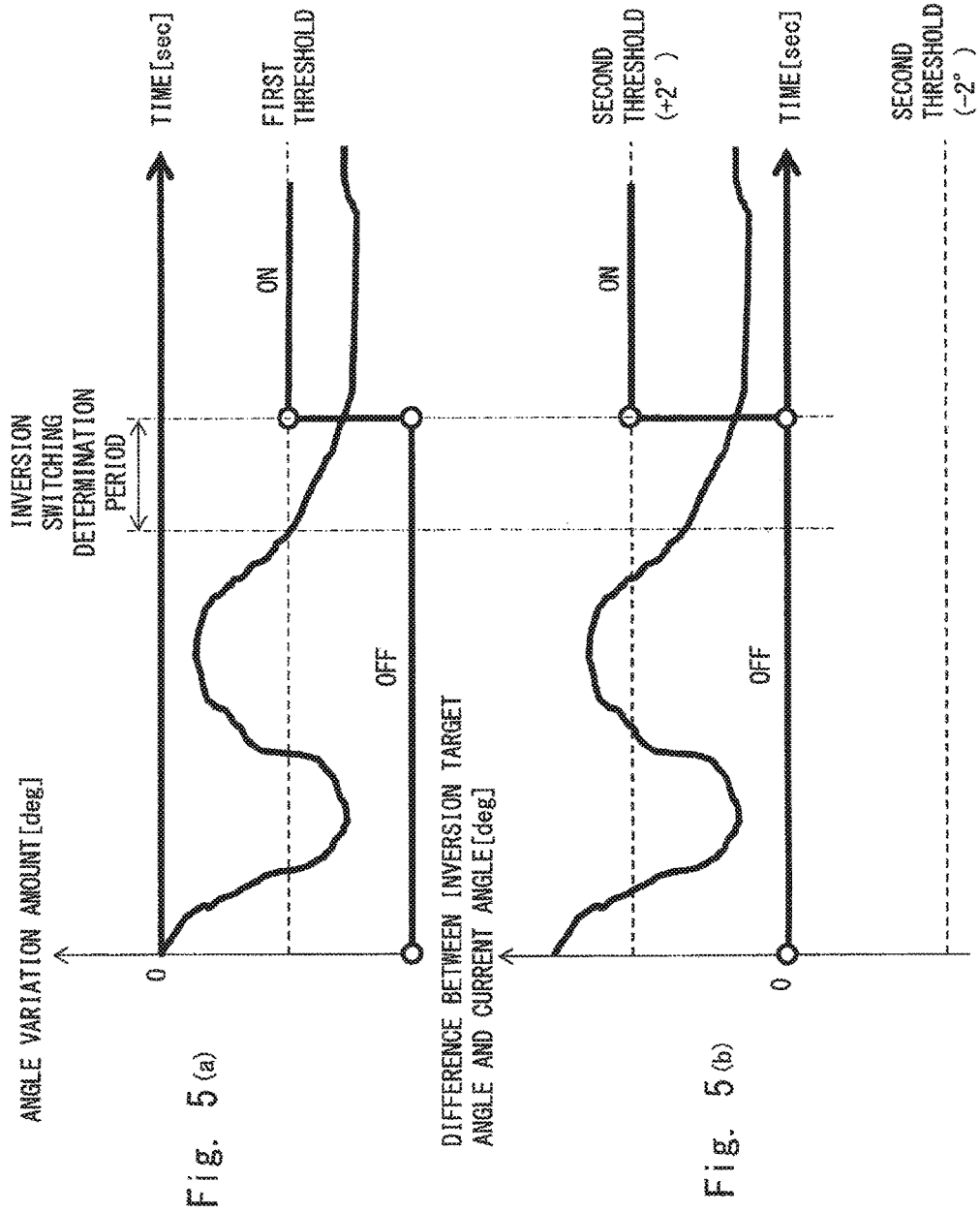
FIG. 5(a) is a diagram showing a relation among an angle variation amount of a riding part in a front-back direction, time, and whether to perform a switch according to a third embodiment.
FIG. 5(b) is a diagram showing a relation among a difference between a rotation angle of the riding part in the front-back direction and an inversion target angle, time, and whether to perform a switch according to the third embodiment.
Figure 6:
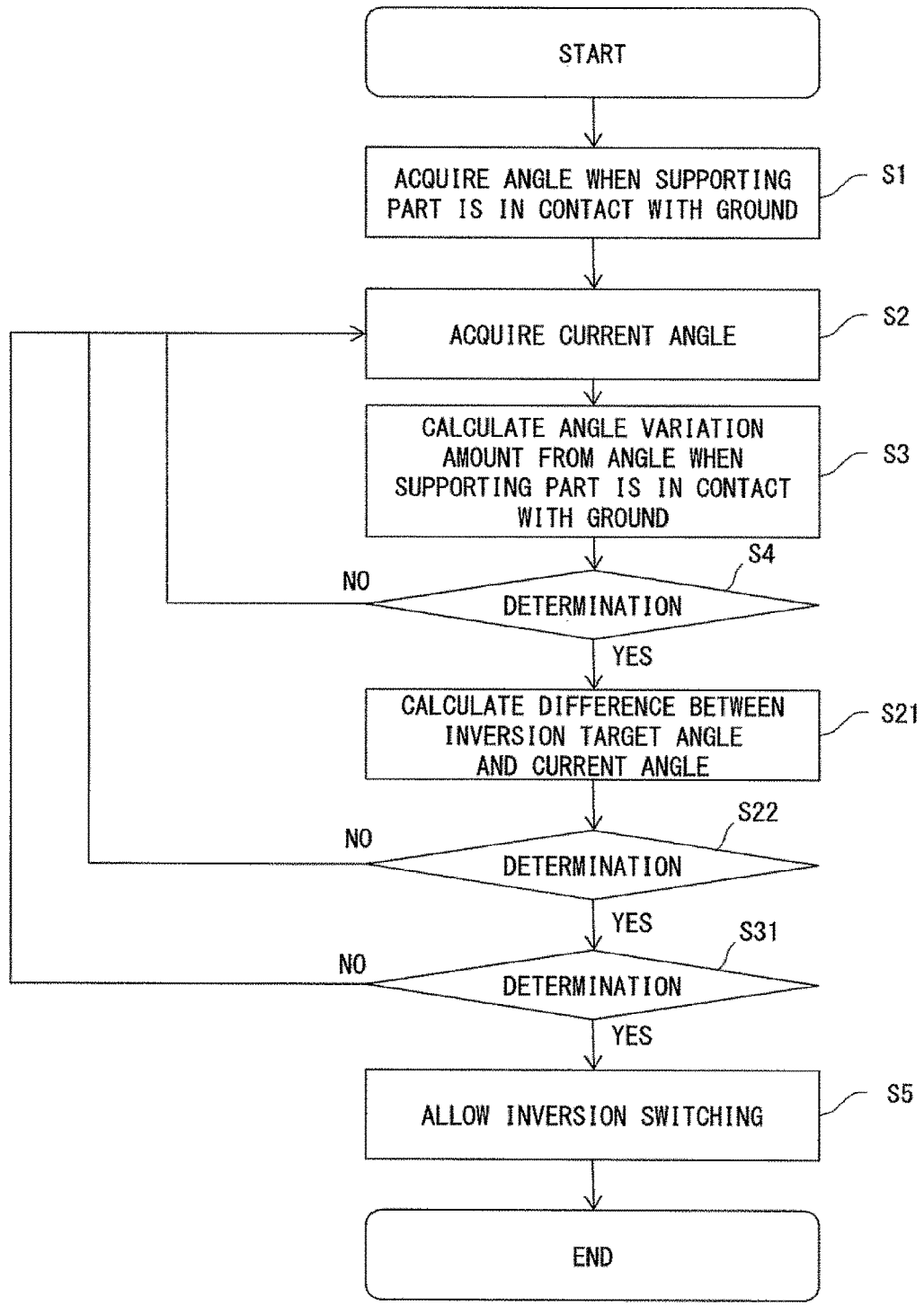
FIG. 6 is a flowchart showing a switching operation according to a third embodiment.

FIG. 5(a) is a diagram showing a relation among the angle variation amount of the riding part in the front-back direction, time, and whether to perform the switch according to a third embodiment. FIG. 5(b) is a diagram showing a relation among the difference between the rotation angle of the riding part in the front-back direction and the inversion target angle, time, and whether to perform the switch according to the third embodiment. FIG. 6 is a flowchart showing a switching operation according to this embodiment. The descriptions already given in regard to the first embodiment and the like are omitted and elements the same as those in the first embodiment and the like are denoted by reference symbols the same as those in the first embodiment and the like.

This embodiment is, as shown in FIG. 6, substantially equal to the second embodiment. In this embodiment, the switching condition further includes a condition that a state in which the angle variation amount θ3 of the riding part 2 is equal to or larger than the first threshold and the difference between the rotation angle θ1 of the riding part 2 and the inversion target angle is equal to or smaller than the second threshold continues for a predetermined period (inversion switching determination period).

Specifically, in the switching operation according to this embodiment, the controller 8 determines, after the process of S22, whether the state in which the angle variation amount $\theta 3$ of the riding part 2 is equal to or larger than the first threshold and the difference between the rotation angle $\theta 1$ of the riding part 2 and the inversion target angle is equal to or smaller than the second threshold continues for the inversion switching determination period (S31).

When the state in which the angle variation amount $\theta 3$ of the riding part 2 is equal to or larger than the first threshold and the difference between the rotation angle $\theta 1$ of the riding part 2 and the inversion target angle is equal to or smaller than the second threshold does not continue for the inversion switching determination period (NO in S31), the controller 8 goes back to S2.

On the other hand, as shown in FIGS. 5(a) and 5(b), when the state in which the angle variation amount $\theta 3$ of the riding part 2 is equal to or larger than the first threshold and the difference between the rotation angle $\theta 1$ of the riding part 2 and the inversion target angle is equal to or smaller than the second threshold continues for the inversion switching determination period (YES in S31), the controller 8 is switched from the non-inverted control state to the inverted control state (S5).

When a person who lacks a sense of balance rides the inverted moving body, for example, the inverted moving body wobbles a lot. Even in this case, according to this embodiment, the switching condition includes the condition that the state in which the angle variation amount $\theta 3$ of the riding part 2 is equal to or larger than the first threshold and the difference between the rotation angle $\theta 1$ of the riding part 2 and the inversion target angle is equal to or smaller than the second threshold continues for the inversion switching determination period, whereby it is possible to suppress switching from the non-inverted control state to the inverted control state in a state in which the user's riding condition is not stable.

Fourth Embodiment

Figure 7:
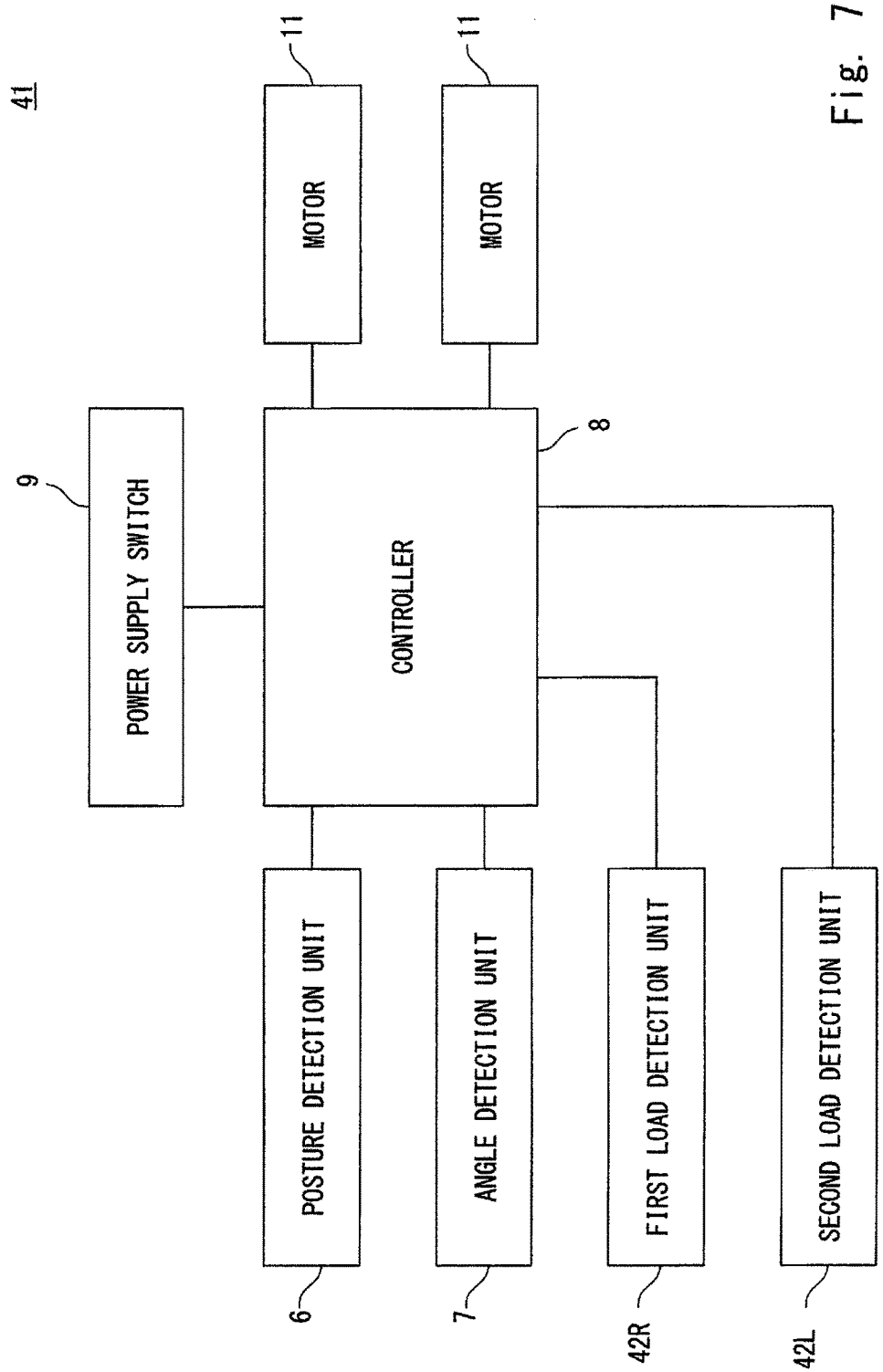
FIG. 7 is a block diagram showing a control system of an inverted moving body according to a fourth embodiment.

FIG. 7 is a block diagram showing a control system of an inverted moving body according to this embodiment. The descriptions already given in regard to the first embodiment and the like are omitted and elements the same as those in the first embodiment and the like are denoted by reference symbols the same as those in the first embodiment and the like.

Besides the configuration of the inverted moving body 1 according to the first embodiment, an inverted moving body 41 according to this embodiment includes a first load detection unit 42R and a second load detection unit 42L. The first load detection unit 42R detects the load output from the right leg of the user when the user rides the riding part 2. The second load detection unit 42L detects the load output from the left leg of the user when the user rides the riding part 2. This first load detection unit 42R and the second load detection unit 42L are provided in the riding part 2 and each output a detection signal to the controller 8.

While the details of a change in the inversion switching determination period will be described later, the controller 8 changes the inversion switching determination period in the third embodiment based on the detection signals output from the first load detection unit 42R and the second load detection unit 42L.

Figure 8:
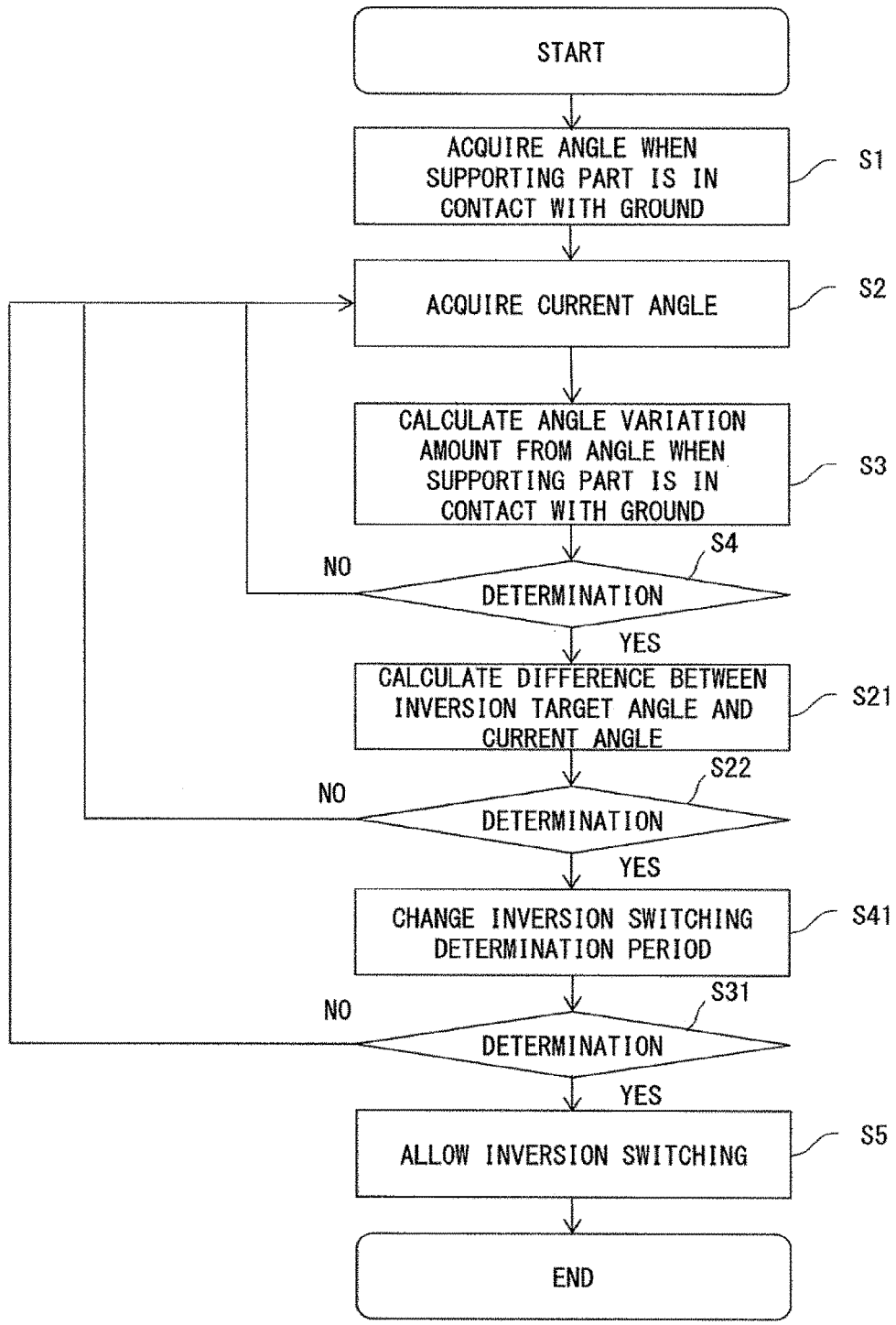
FIG. 8 is a flowchart showing a switching operation according to the fourth embodiment.
Figure 9:
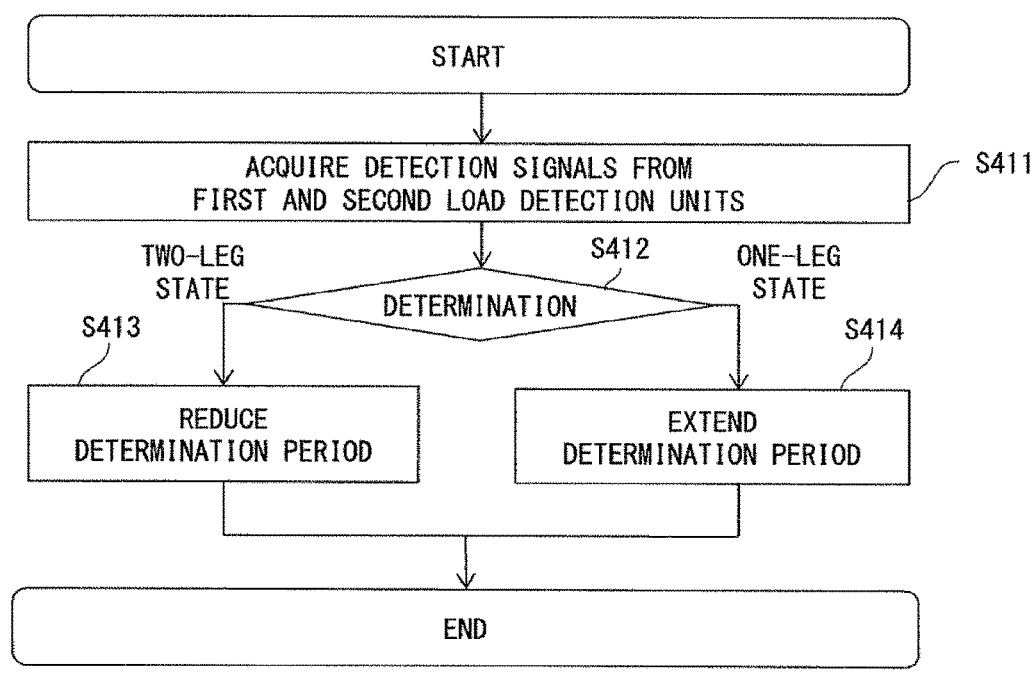
FIG. 9 is a diagram showing an operation for changing an inversion switching determination period according to the fourth embodiment.

Next, a switching operation according to this embodiment will be described. FIG. 8 is a flowchart showing the switching operation according to this embodiment. FIG. 9 is a diagram showing an operation of changing the inversion switching determination period according to this embodiment.

The switching operation according to this embodiment is, as shown in FIG. 8, substantially equal to that in the third embodiment. The switching operation according to this embodiment includes, after the process of S22, a process of S41, where the controller 8 changes the inversion switching determination period. Specifically, in the process of S41, as shown in FIG. 9, the controller 8 first acquires the detection signals from the first load detection unit 42R and the second load detection unit 42L (S411).

Next, the controller 8 determines whether each load indicated by each detection signal output from the first load detection unit 42R and the second load detection unit 42L is equal to or larger than the third threshold to determine whether the state in which the user rides the riding part 2 is in the one-leg state or the two-leg state (S412).

Next, when the state in which the user rides the riding part 2 is in the two-leg state, the controller 8 reduces the inversion switching determination period (S413) and moves to the process of S31. On the other hand, when the state in which the user rides the riding part 2 is in the one-leg state, the controller 8 extends the inversion switching determination period (S414) and moves to the process of S31.

As described above, in this embodiment, the inversion switching determination period is changed based on the result of the determination as to whether the state in which the user rides the riding part 2 is in the one-leg state or the two-leg state. It is therefore possible to suppress switching from the non-inverted control state to the inverted control state when the state in which the user rides the riding part 2 is the one-leg state. Further, when the state in which the user rides the riding part 2 is the two-leg state, the non-inverted control state is quickly switched to the inverted control state.

While the user's riding condition has been determined using the load detection unit in this embodiment, any other device may be used as long as it is possible to detect that the user has put the right and left leg parts on the riding part 2. For example, the user's riding condition may be determined using a contact sensor or the like.

Fifth Embodiment

Figure 10:
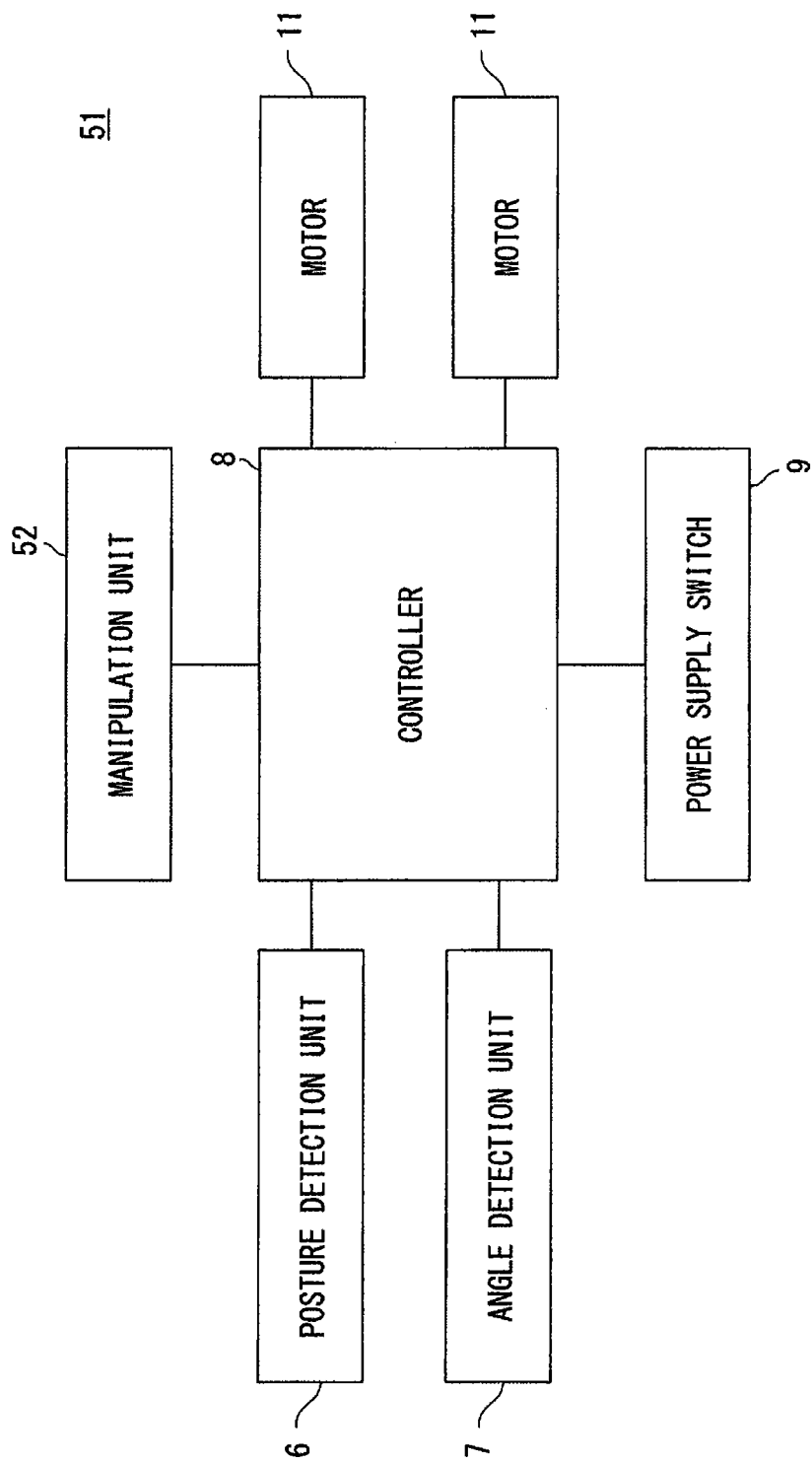
FIG. 10 is a block diagram showing a control system of an inverted moving body according to a fifth embodiment.

FIG. 10 is a block diagram showing a control system of an inverted moving body according to this embodiment. The descriptions already given in regard to the first embodiment and the like are omitted and elements the same as those in the first embodiment and the like are denoted by reference symbols the same as those in the first embodiment and the like.

Besides the configuration of the inverted moving body 1 according to the first embodiment, an inverted moving body 51 according to this embodiment includes a manipulation unit 52 that changes the inversion switching determination period. The manipulation unit 52 is manipulated by the user. In this embodiment, when the user turns on the manipulation unit 52, a command signal is output to the controller 8 to prevent the execution of the determination of whether the state in which the angle variation amount $\theta 3$ of the riding part 2 is equal to or larger than the first threshold and the difference between the rotation angle $\theta 1$ of the riding part 2 and the inversion target angle is equal to or smaller than the second threshold continues for the inversion switching determination period.

On the other hand, when the user turns off the manipulation unit 52, a command signal is output to the controller 8 to execute the determination of whether the state in which the angle variation amount θ3 of the riding part 2 is equal to or larger than the first threshold and the difference between the rotation angle θ1 of the riding part 2 and the inversion target angle is equal to or smaller than the second threshold continues for the inversion switching determination period.

While the manipulation unit 52 according to this embodiment switches the determination of whether to execute the determination of whether the state in which the angle variation amount θ3 of the riding part 2 is equal to or larger than the first threshold and the difference between the rotation angle θ1 of the riding part 2 and the inversion target angle is equal to or smaller than the second threshold continues for the inversion switching determination period, such a configuration may be employed, for example, in which the inversion switching determination period is reduced or extended by a touch panel or the like.

Figure 11:
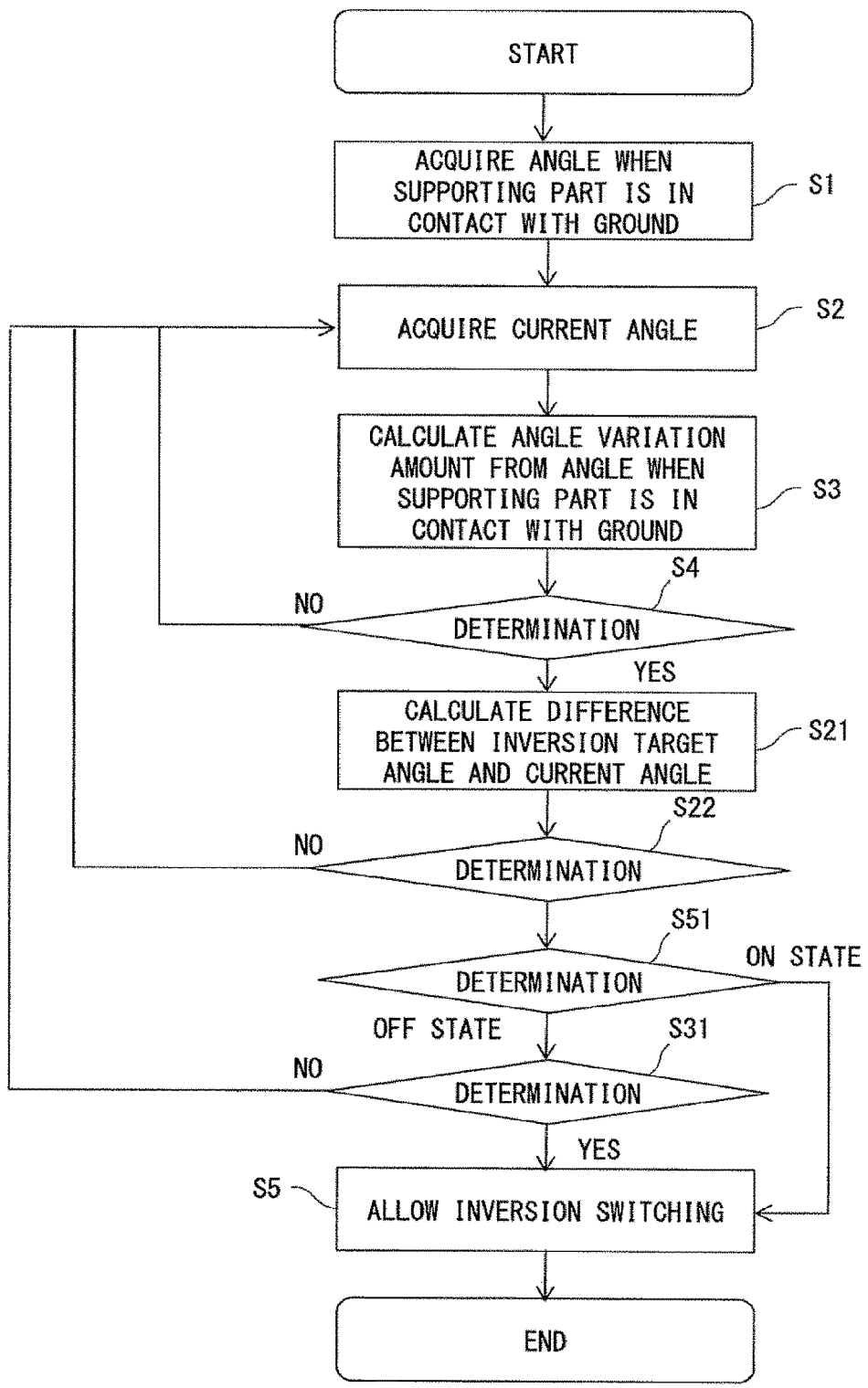
FIG. 11 is a flowchart showing a switching operation according to the fifth embodiment.

Next, a switching operation according to this embodiment will be described. FIG. 11 is a flowchart showing the switching operation according to this embodiment. The switching operation according to this embodiment is substantially equal to that in the third embodiment. After the process of S22, the controller 8 determines whether the manipulation unit 52 is in the ON state or the OFF state (S51). When the manipulation unit 52 is in the ON state, the controller 8 moves to the process of S5. On the other hand, when the manipulation unit 52 is in the OFF state, the controller 8 moves to the process of S31.

As described above, according to this embodiment, it is possible to easily switch the determination of whether to execute the determination of whether the state in which the angle variation amount θ3 of the riding part 2 is equal to or larger than the first threshold and the difference between the rotation angle θ1 of the riding part 2 and the inversion target angle is equal to or smaller than the second threshold continues for the inversion switching determination period according to the state of the manipulation unit 52.

Sixth Embodiment

When the inverted moving body 1 is rotated backwardly with respect to the inversion target angle (e.g., 0°) within the inversion switching determination period or the rotation angle θ1 of the inverted moving body 1 reaches the inversion target angle, the controller 8 preferably determines that the switching condition has been satisfied and switches the non-inverted control state to the inverted control state. It is therefore possible to suppress a backward overturn of the inverted moving body in the inversion switching determination period.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

While the user stands on the riding part of the inverted moving body in the inverted posture according to the above embodiments, the riding part may be a seat so that the user can be seated in the seat. Further, while the inverted moving body according to the above embodiments includes the right and left driving wheels, it may include only one driving wheel.

While it is determined whether the state in which the angle variation amount θ3 of the riding part 2 is equal to or larger than the first threshold and the difference between the rotation angle θ1 of the riding part 2 and the inversion target angle is equal to or smaller than the second threshold continues for the inversion switching determination period in the above embodiments, the non-inverted control state may be switched to the inverted control state when the state in which the angle variation amount θ3 of the riding part 2 is equal to or larger than the first threshold continues for the inversion switching determination period.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An inverted moving body comprising:
a riding part which a user rides;
a driving wheel;
a posture detection unit that detects a rotation angle of the riding part in a front-back direction;
a controller that determines whether a switching, condition to switch from a non-inverted control state to an inverted control state is satisfied based on the rotation angle of the riding part in the front-back direction, and when the switching condition is satisfied, the controller switches from the non-inverted control state to the inverted control state;
a supporting part to support the inverted moving body in the non-inverted control state, the supporting part being in contact with the ground in the non-inverted control state, and the supporting part being located forward or backward with respect to the driving wheel; and
a manipulation unit that the user turns on or off to change a predetermined period of time, wherein
the switching condition comprises a condition that an angle variation amount from the rotation angle of the riding part in the front-back direction while the supporting part is in contact with the ground, is equal to or larger than a threshold,
the switching condition comprises a condition that a state in which the angle variation amount from the rotation angle of the riding part in the front-back direction while the supporting part is in contact with the ground, is equal to or larger than the threshold, continues for the predetermined period of time, and
the controller changes the predetermined period of time based on a manipulation signal of the manipulation unit.

2. The inverted moving body according to claim 1, comprising:
a first load detection unit that detects a load input to the riding part from a first leg of the user; and
a second load detection unit that detects a load input to the riding part from a second leg of the user,
wherein, when one of the first load detection unit and the second load detection unit outputs a detection signal, the controller increases the predetermined period of time compared to that during a case in which the first load detection unit and the second load detection unit output detection signals.

3. An inverted moving body comprising:
a riding structure which a user rides;
a driving wheel;
a sensor to detect a rotation angle of the riding structure in a front-back direction;
circuitry configured to:

determine whether a switching condition to switch from a non-inverted control state to an inverted control state is satisfied based on the rotation angle of the riding structure in the front-back direction, and when the switching condition is satisfied, switch from the non-inverted control state to the inverted control state;

a supporting structure to support the inverted moving body in the non-inverted control state, the supporting structure being in contact with the ground in the non-inverted control state, and the supporting structure being located forward or backward with respect to the driving wheel; and a mechanism that the user turns on or off to change a predetermined period of time, wherein the switching condition comprises a condition that an angle variation amount from the rotation angle of the riding structure in the front-back direction while the supporting structure is in contact with the ground, is equal to or larger than a threshold, the switching condition comprises a condition that a state in which the angle variation amount from the rotation angle of the riding structure in the front-hack direction while the supporting structure is in contact with the ground, is equal to or larger than the threshold, continues for the predetermined period of time, and the circuitry is configured to change the predetermined period of time based on a manipulation signal of the mechanism.

4. The inverted moving body according to claim 3, comprising:

a first load detection sensor that detects a load input to the riding structure from a first ea of the user; and a second load detection sensor that detects a load input to the riding structure from a second leg of the user, wherein, when one of the first load detection sensor and the second load detection sensor outputs a detection signal, the circuitry is configured to increase the predetermined period of time compared to that during a case in which the first load detection sensor and the second load detection sensor output detection signals.

* * * * *